United States Patent Office 2,812,331
Patented Nov. 5, 1957

2,812,331

SUBSTITUTED BUTYRIC ACID AMIDE COMPOUNDS AND PREPARATION THEREOF

August-Hans Lutz and Otto Schnider, Basel, Switzerland, assignors to Hoffmann-La Roche Inc., Nutley, N. J., a corporation of New Jersey No Drawing. Application September 30, 1954, Serial No. 459,556

Claims priority, application Switzerland October 6, 1953

2 Claims. (Cl. 260—294)

The present invention concerns a process for the manufacture of novel piperidine derivatives and the novel products obtained by the said process.

In particular, the invention provides the novel 2-phenyl-2 - (1 - cyclohexenyl) - 4 - (1 - piperidyl) - butyric acid amide and acid addition salts thereof, such as the hydrochloride, the hydrobromide, the sulphate, the acetate, the phosphate, the tartrate, the citrate. The free base forms colorless crystals. The acid addition salts thereof, which may be obtained by reacting in aqueous solution equivalent amounts of the base and the corresponding acid, give stable aqueous solutions, which may be sterilized. The 2 - phenyl - 2 - (1 - cyclohexenyl) - 4 - (1 - piperidyl)- butyric acid amide and the acid addition salts thereof possess a pronounced anti-cholinergic activity and may therefore be used as pharmaceuticals.

The invention further provides a process for the manufacture of the above-mentioned novel piperidine derivatives, which process comprises partially hydrolysing 2 - phenyl - 2 - (1 - cyclohexenyl) - 2 - (1 - piperidyl)- butyro-nitril. The partial hydrolysation is preferably effected either by means of solutions of alkali hydroxides in alcohol containing a small amount of water, or by heating with concentrated acids for a short time. When conducting the hydrolysation in this manner, the nitril groups are neither split off nor converted into the acid.

*Example 1*

A mixture of 1 part by weight of 2-phenyl-2-(1-cyclohexenyl) - 4 - (1 - piperidyl) - butyro - nitril (or alternatively 1.12 parts by weight of the hydrochloride of the said compound) and 4 parts by volume of 80% sulphuric acid is heated to 130° C. for 10 minutes, whereupon it is poured on ice and filtrated. The free base obtained is precipitated from the filtrate by means of an alkaline agent. The 2 - phenyl - 2 - (1 - cyclohexenyl) - 4 - (1- piperidyl) - butyric acid amide thus formed melts at 132–133° C. and may be obtained in colorless crystals by recrystallizing the same in a mixture of benzene and petroleum ether.

*Example 2*

One part by weight of 2 - phenyl - 2 - (1 -cyclohexenyl) - 4 - (1 - piperidyl) - butyro - nitril is dissolved in 3 parts by volume of 95% methanol, 1.5 parts by weight of potassium hydroxide are added and the mixture is refluxed for 16 hours. Then it is poured on ice and extracted with benzene. The solvent is then distilled off from the extract and the residue is recrystallized from a mixture of benzene and petroleum ether. The 2-phenyl-2 - (1 - cyclohexenyl) - 4 - (1 - piperidyl) - butyric acid amide obtained melts at 132–133° C.

We claim:

1. A compound selected from the group consisting of 2 - phenyl - 2 - (1 - cyclohexenyl) - 4 - (1 - piperidyl)- butyric acid amide and the acid addition salts thereof.

2. 2 - phenyl - 2 - (1 - cyclohexenyl) - 4 - (1 - piperidyl) - butyric acid amide.

References Cited in the file of this patent

UNITED STATES PATENTS 2,647,122     Archer _____ July 28, 1953

FOREIGN PATENTS 504,085     Belgium _____ July 14, 1951

OTHER REFERENCES

Karrer, Org. Chem. (Elsevier Pub. Co.), 2nd ed., p. 178 (1946).